Dec. 17, 1935.  M. CENCORA  2,024,817
SIGNALING DEVICE FOR VEHICLES
Filed April 7, 1934
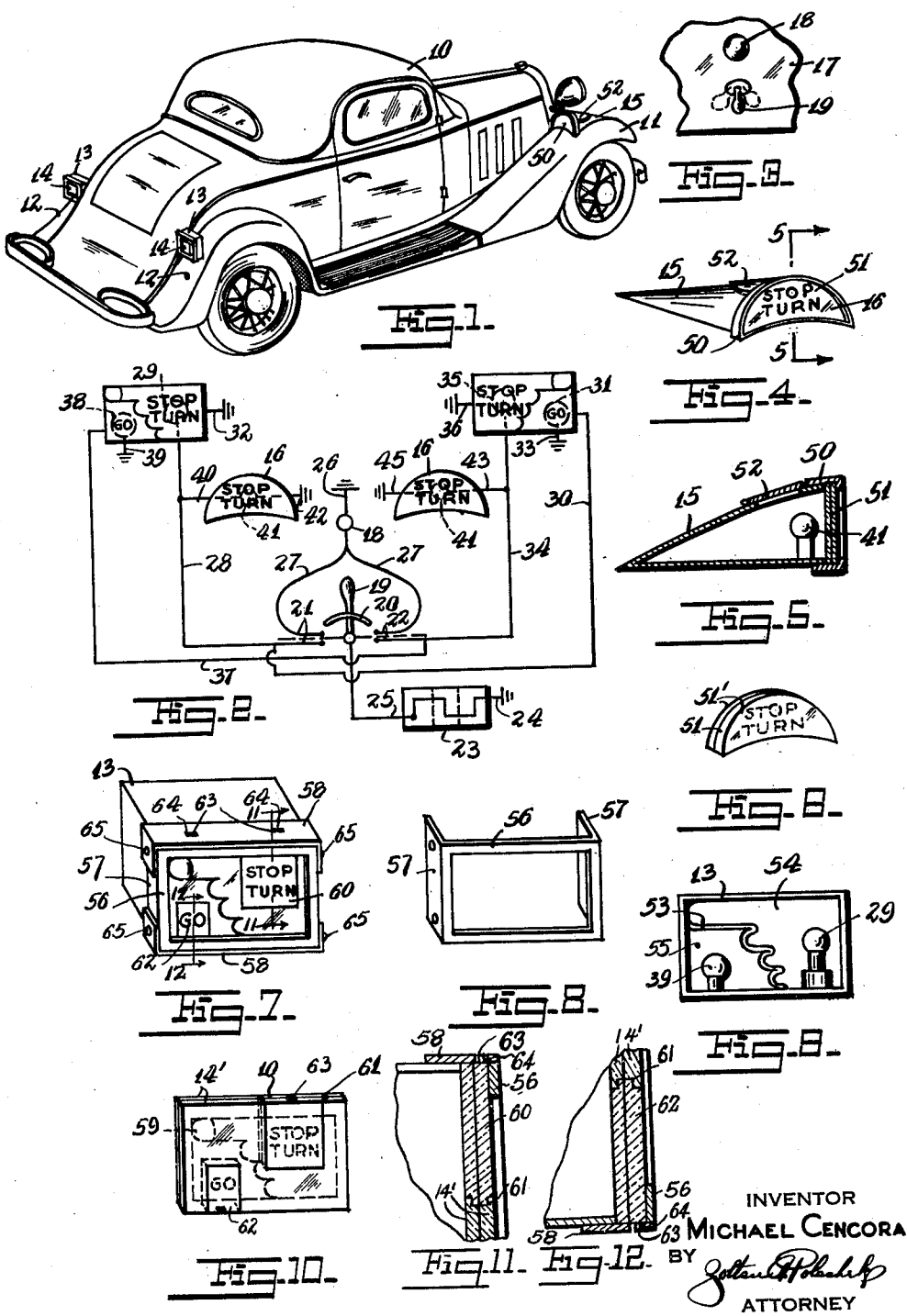
INVENTOR
MICHAEL CENCORA
BY
ATTORNEY Patented Dec. 17, 1935

2,024,817

UNITED STATES PATENT OFFICE 2,024,817

SIGNALING DEVICE FOR VEHICLES

Michael Cencora, Bayside, N. Y.

Application April 7, 1934, Serial No. 719,449

4 Claims. (Cl. 177—329)

This invention relates to new and useful improvements in signaling devices and has more particular reference to a novel "stop turn" signaling light device for attachment upon vehicles for city traffics and highways.

The invention has for an object the construction of a device as mentioned which is adapted to be attached upon a vehicle on the fenders, the back of head lights, on top of spare wheel guards, or any other places.

Still further the invention also proposes an arrangement whereby the "stop turn" signaling signs can be made of various designs to please personal tastes according to artistic senses.

Still further the invention proposes the construction of a device as mentioned which is characterized by signals for attachment upon the right and left hand sides of a vehicle, adapted to be associated with circuits for controlling said signals to indicate "stop turn" or "go".

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a motor vehicle equipped with a device according to this invention.

Fig. 2 is a schematic diagram of the device showing in particular the signals, other apparatus and the electrical circuits of the device.

Fig. 3 is a fragmentary elevational view of the dash board of the vehicle shown in Fig. 1 illustrating the control apparatus thereon.

Fig. 4 is a perspective view of a signal which is located upon one of the front fenders.

Fig. 5 is a sectional view taken on the line 5—5 of Fig. 4.

Fig. 6 is a perspective view of a translucent sign in the front of the casing illustrated in Figs. 4 and 5.

Fig. 7 is a perspective view of one of the signals upon the rear of the vehicle.

Fig. 8 is a perspective view of a portion of the front cover of a signal illustrated in Fig. 7.

Fig. 9 is a front elevational view of the signal illustrated in Fig. 7 with the front cover removed.

Fig. 10 is a perspective view of the translucent sign in the front cover of the signal shown in Fig. 7.

Fig. 11 is a fragmentary enlarged sectional view taken on the line 11—11 of Fig. 7.

Fig. 12 is a fragmentary enlarged sectional view taken on the line 12—12 of Fig. 7.

The device according to this invention is applied upon a motor vehicle 10 having front fenders 11 and rear fenders 12. Various signals of the apparatus are shown mounted upon these fenders, but it must be understood that these signals may be mounted on other parts of the body of the vehicle.

More particularly the device comprises a pair of rear signals, each consisting of a signal casing 13 for attachment upon the right hand or left hand sides of the vehicle 10, and provided with "stop turn" and "go" signs 14 illuminated with lamps as hereinafter further described. The casings 13 are mounted upon the rear fenders 12. Mounted upon the front fenders 11 there are additional signals in the form of casings 15 for location upon the right and left sides and provided with "stop turn" signs 16. The vehicle 10 has a dash board 17 which is equipped with a pilot light 18 and with a double throw switch 19 by which the signal devices may be operated. The switch and pilot light may be placed at any other suitable location within the vehicle.

More particularly the double throw switch comprises a movable handle 19 carrying a contact 20 adapted to connect selectively with switch sections 21 and 22. A battery 23 has its negative terminal 24 grounded. Its positive terminal is connected by a lead 25 with the movable contact 20 of the double throw switch. The pilot light 18 has one of its terminals 26 grounded and has its other terminal connected by the leads 27 connected separately with the switch sections 21 and 22.

A lead 28 connects the switch section 21 with a lamp 29 adapted to illuminate the "stop turn" portion of the signal device upon the left side of the vehicle. Another lead 30 connects with the lead 28 and with a lamp 31 adapted to illuminate the "go" portion of the indicating sign in the right hand signal on the rear of the vehicle. The lamp 29 has one of its terminals 32 grounded. The lamp 31 also has one of its terminals 33 grounded.

The switch section 22 is connected with a lead 34 connected with a lamp 35 for illuminating the "stop turn" portion of the signal at the right and at the rear of the vehicle. This lamp 35 has its other terminal grounded at 36. A lead 37 connects with the lead 34 and with a lamp 38 controlling the "go" sign of the right hand rear signal device. The lamp 38 has its other terminal connected with the ground 39. A lead 40 connects with the lead 28 and with a lamp 41 controlling the "turn stop" sign 16. This lamp is grounded at 42. Another lead 43 connects with the lead 34 and with a lamp 44 for illuminating the "stop turn" sign 16 at the right hand side. This lamp 44 is grounded at 45.

The front signaling devices comprise casings 15 which are substantially of conical form and attached upon the front fenders. These casings 15 are provided with open front ends closed with covers 50. Each of these covers supports a translucent window 51 extended across the front of the casing 15 and constituting the "stop turn" sign 16. The lamps for illuminating the signs are mounted within the casings 15 and may be replaced when desired through doors 52 mounted upon the casings. Each of the translucent signs 51 comprises a pair of glass plates 51', cemented together. The contacting faces of these glass plates are painted or in any other manner formed with the translucent material inscribed with the words "Stop turn".

Now referring to the rear signals, each of the casings 13 is divided by a partition 53 into compartments 54 and 55. The compartment 54 is provided with the lamp for illuminating a "stop turn" sign while the compartment 55 is provided with a lamp for illuminating a "go" sign. Each of the casings 13 is provided with a removable cover comprising a frame portion 56 with integral sides 57. Removable top and bottom portions 58 are mounted across the sides 57. A sign element is mounted within each cover and comprises a pair of adjacent panes of glass 14' cemented together. The adjacent faces of these panes of glass are painted or in any other manner formed with translucent material producing the sign. The sign has one portion constituting a hand with the index finger pointing in one direction and indicated by the reference numeral 59. This portion is also provided with words "Stop turn" arranged upon a removable and reversible piece 60. This removable piece is formed with tongues 61 upon its sides engaging in corresponding grooves in the main portion. This sign is also provided with a "go" portion arranged upon another removable section 62 similarly constructed. Each of the removable portions of the sign is provided with projections 63 offset relative to the adjacent faces of the panes 14'. These projections 63 are adapted to engage in receiving openings 64 in the removable portions 58 of the cover. The portions 58 are removably held by reasons of screws 65 engaging through the ends thereof and into portions of the side portions 57.

In Fig. 7 an assembly of one of the signals is illustrated. The partition 53 serves to limit the interior lamps to illuminate one or the other part of the sign. A feature of the construction is that the signs may be adjusted into one or the other of the signals at the rear of the vehicle, that is, that it may be a right or a left sign. As illustrated in Fig. 7 the sign is a left sign. The glass may be removed from this casing and transferred to a right casing in the following fashion: The removable pieces 60 and 62 should be removed and replaced in reversed condition. Then the entire sign should be engaged on the other casing in reversed condition; that is, the back should now be in the front. A feature, is the fact that because of the location of the projections 63 offset from the center of the thickness of the panes 14 and 15, the relative positions of the pieces 60 and 62, and the pieces 14' is determined, by the slots 64, which are so arranged that the printing is at all times in a normal reading condition from the front.

The operation of the device is as follows: When the driver wishes to turn left he moves the handle 19 of the switch 20 towards the left so that the element 20 connects with the switch section 21. This causes the "stop turn" lamp 29 to become illuminated and illuminates the "stop turn" sign in the signal at the left. Simultaneously the "go" sign of the right signal controlled by the lamp 31 at the right is illuminated. At the front of the vehicle the "stop turn" signal at the left will be illuminated because the lamp 41 lights simultaneously with the lamp 29.

A turn to the right is signaled by moving the switch 20 so that the contact 20 engages the switch section 22. This will cause illumination of the lamps 35, 44 and 38, to respectively illuminate the two "stop turn" signs at the right, at front and rear, and the "go" sign in the left signal in the rear. In either operative positions of the switch 20 the pilot light 18 is illuminated for indicating these conditions of the switch.

It is to be understood that the words "go" or "stop" may be eliminated entirely, together with the corresponding wiring, if it is desired.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a turn indicator signal for vehicles, an open front casing, a cover for engaging over the front of said casing and comprising a panel front with connected side portions and removable top and bottom portions, a translucent sign engaged across said open front casing and held in place by said cover and having portions for pointing direction, and removable reversible portions printed with instructions, and projections from said removable portions of the sign engaging in openings in said removable portions of the cover and offset to guide placing of the printed instructions readable from the front of the casing irrespective of the engagement of the pointing direction portion directed in one direction or the other direction.

2. In a turn indicator signal for vehicles, an open front casing, a cover for engaging over the front of said casing and comprising a panel front with connected side portions and removable top and bottom portions, a translucent sign engaged across said open front casing and held in place by said cover and having portions for pointing directions, and removable reversible portions printed with instructions, and projections from said removable portions of the sign engaging in openings in said removable portions of the cover and offset to guide placing of the printed instructions readable from the front of the casing irrespective of the engagement of the pointing direction portion directed in one direction or the other direction, said removable top and bottom portions having ends engaging over the fixed side portions, and screws engaging through these parts to hold the removable portions in position.

3. In a turn indicator signal for vehicles, an open front casing, a cover for engaging over the front of said casing and comprising a panel front with connected side portions and removable top and bottom portions, a translucent sign engaged across said open front casing and held in place by said cover and having portions for pointing direction, and removable reversible portions printed with instructions, and projections from said removable portions of the sign engaging in openings in said removable portions of the cover and offset to guide placing of the printed instructions readable from the front of the casing irrespective of the engagement of the pointing direction portion directed in one direction or the other direction, said translucent sign comprising a pair of panes of glass cemented together and having painted signs on the adjacent sides.

4. In a turn indicator signal for vehicles, an open front casing, a cover for engaging over the front of said casing and comprising a panel front with connected side portions and removable top and bottom portions, a translucent sign engaged across said open front casing and held in place by said cover and having portions for pointing direction, and removable reversible portions printed with instructions, and projections from said removable portions of the sign engaging in openings in said removable portions of the cover and offset to guide placing of the printed instructions readable from the front of the casing irrespective of the engagement of the pointing direction portion directed in one direction or the other direction, said translucent sign comprising a pair of panes of glass cemented together and having painted signs on the adjacent sides, and said removable reversible sections having edge flanges engaging in receiving reversible sections having edge flanges engaging in receiving grooves to accomplish the removable and reversible construction.

MICHAEL CENCORA.